May 16, 1933.  J. R. REYBURN  1,909,896
CHAIN CONNECTER
Filed March 30, 1931
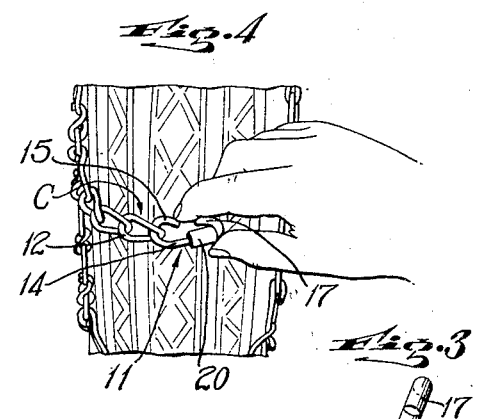
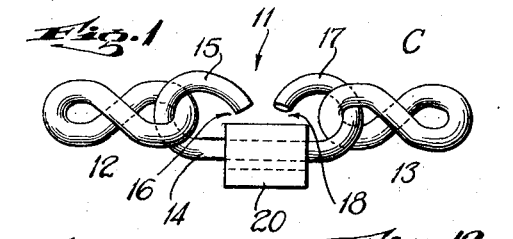
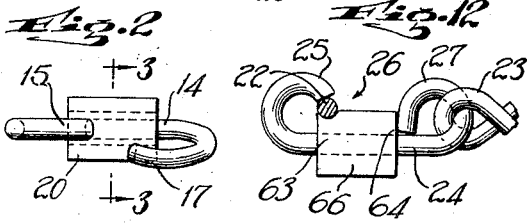
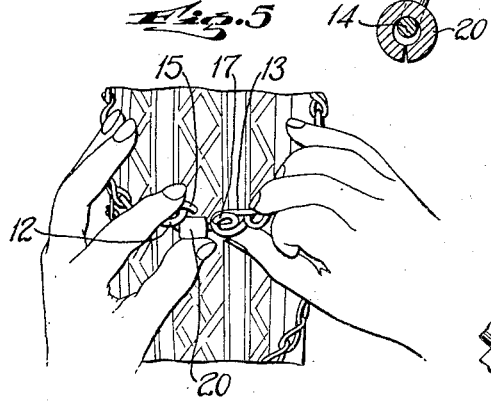
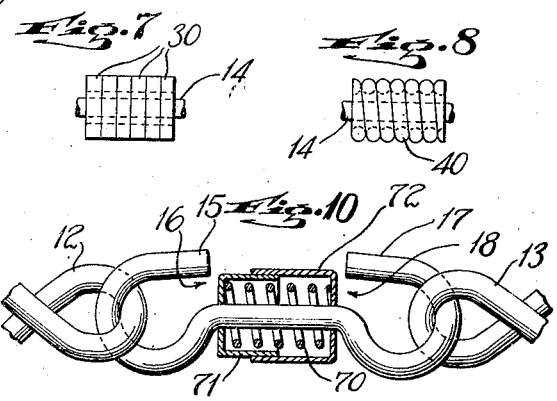
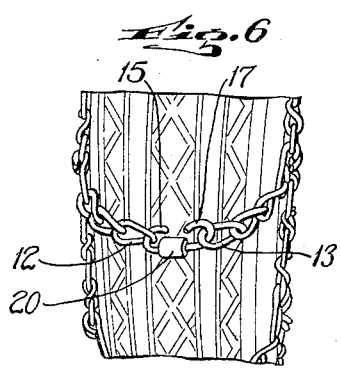
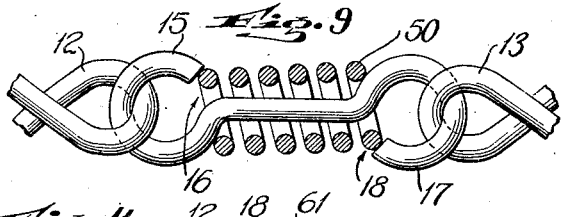
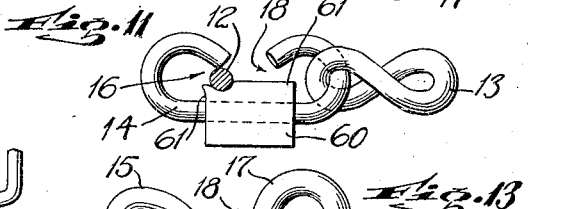
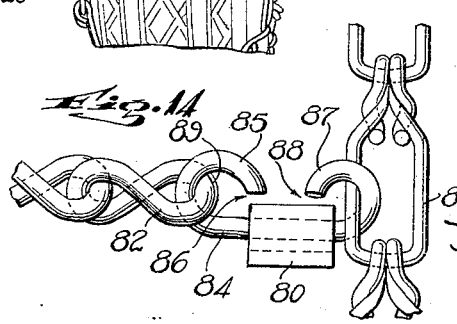
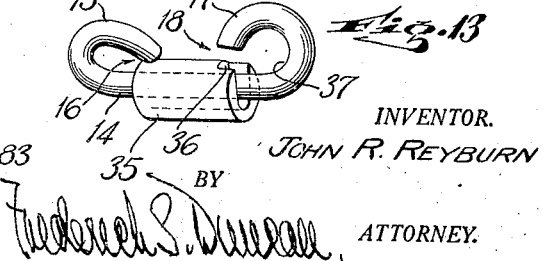
INVENTOR.
JOHN R. REYBURN
BY
ATTORNEY.

Patented May 16, 1933

1,909,896

UNITED STATES PATENT OFFICE

JOHN R. REYBURN, OF FAIRFIELD, CONNECTICUT, ASSIGNOR TO AMERICAN CHAIN COMPANY, INC., A CORPORATION OF NEW YORK

CHAIN CONNECTER

Application filed March 30, 1931. Serial No. 526,162.

This invention relates to connecting devices for chains, and more particularly to connecting hooks or links for the cross chains of anti-skid tire chains.

An object of the invention is to provide a connecting link or hook adapted to serve as a repair link for a broken cross-chain, and in pursuance of this object the chain connecter is formed with a shank terminating in an open hook at each end, or at least at one end, and has a keeper of annular form mounted on the shank and adapted to close the opening of the hook yieldingly, so that a separate link may be introduced to each of the hooks so guarded and will be held against unintended disengagement therefrom.

With a repair link embodying the feature above briefly described, the loose ends of a broken cross-chain may be readily and rapidly connected together, with the exercise of but ordinary skill, and will continue so connected until the repair link or the cross-chain wears out, the repair link being preferably removable readily by a manual operation, however.

The invention may also be embodied in readily applied connecting hooks for connecting the ends of a cross-chain to links of the side-chains, as will be described more at length in the accompanying specifications.

In carrying the invention into effect, the annular keeper may be formed of various suitable materials, such as sheet metal, coiled wire, perforated metal disks, rubber and other materials, and the yielding effect may be provided in various ways, as by mounting the keeper slidingly upon the shank, or by the elasticity of its material, as for example when rubber or a spring coil is used.

A further object served by a keeper of the above form is the reinforcement of the link, the annular keeper sharing in the wear on the link and acting to distribute the same when the keeper is mounted rotatably on the shank, which is the preferred form of arrangement thereof.

Another object of the invention is to provide a chain-connecter characterized by a shank having open end-hooks to receive chain links to be connected, and a sliding keeper on said shank adapted to be maintained in hook-closing position by the connected links when occupying their relative positions normal to use of the chain, said keeper being movable into one of said hooks when the link therein is manipulated in said hook to clear the path of the keeper, whereby the other hook may be cleared for disconnection or connection of its corresponding link.

The above, and other, features of the invention are illustrated and described fully in the accompanying drawing and specification and are pointed out in the claims.

In the drawing,

Fig. 1 is a view in side elevation of part of a cross-chain of an anti-skid tire chain, provided with a link or hook embodying the invention, and used as a repair link.

Fig. 2 is a plan view of the repair link shown in Fig. 1.

Fig. 3 is a cross-section taken on the line 3—3 of Fig. 2.

Figs. 4 and 5 are views illustrating the manner in which the device is applied to a cross-chain in place on a tire.

Fig. 6 is a similar view showing the repaired cross-chain ready for use.

Fig. 7 is a fragmentary, detail view of a modification in which an assembly of rings constitutes the annular keeper.

Fig. 8 is a similar view of another modification, showing a keeper formed of closely coiled wire.

Fig. 9 is a view of another modification in which an expanding coil spring constitutes the keeper.

Fig. 10 is a view of a modification embodying a telescopic form of annular keeper with a coiled spring enclosed therein.

Fig. 11 shows a modification in which a compressible annular keeper is formed of elastic material, such as rubber.

Fig. 12 is a view, similar to Fig. 1, showing a modification to be described.

Fig. 13 is a view of a keeper of the general type shown in Figs. 1 to 3, but having a notched end for a purpose to be described.

Fig. 14 is a view similar to Fig. 1, showing the invention embodied in a readily applicable connecting hook by which a cross-chain is attached to a side chain of a tire chain.

In a now preferred embodiment of the invention selected for illustration and description, and referring to Figs. 1 to 6 inclusive, the reference character C designates generally part of a cross chain of an anti-skid tire chain which has been broken in usage, one of the original links being missing and replaced by a repair link in the construction of which the invention has been embodied, this link being designated generally by the reference numeral 11 and being shown as connecting the adjacent free ends 12 and 13 of the broken cross chain. The latter is illustrated as being of conventional curb or twisted link type, although it will be understood that the improved repair link forming the subject of the present invention may be used to connect other types of cross chain, or chain of any form to which a link embodying the invention may be applied advantageously, by virtue of its structure.

In pursuance of the invention, the improved link comprises a shank portion 14 and an open hook portion 15 formed in continuation thereof, the hook extending toward an intermediate portion of the shank and having an opening 16 through which a separate link, such as that shown at 12, may be introduced to permit its application to the repair link.

A similar hook 17 is shown at the other end of the shank, having an opening 18 similar to the opening 16 already described and which is adapted to permit the introduction of another link, such as that shown at 13, for the purpose of joining the free ends of the broken cross chain.

In accordance with the invention, a keeper of annular form 20 is shown, mounted upon the shank 14 and which in the instance illustrated surrounds the shank and is of such length that when it occupies the intermediate position illustrated in Figs. 3 and 6, the keeper will prevent disengagement of the links 12 and 13 from the repair link.

A repair link of this form may be applied to the cross chain which is to be repaired, in the following manner, illustrated in Figs. 4 and 5, viz.:

The keeper 20 may be moved slidingly along the shank 14 toward one end hook, for example that numbered 17, the opening 18 being of sufficient size to permit such sliding movement, and when the keeper reaches the position shown in Fig. 4, the opening 16 of the hook at the opposite end of the link will be cleared sufficiently to permit the introduction of the link 12 through the opening 16 into articulated relation with the hook 15, and the link 12 is then manipulated by the operator within the body of the hook 15, as illustrated in Fig. 5, out of the path of the keeper 20, and the latter is moved slidingly toward the hook 15 until it clears the opening 18 of the hook 17 as shown. Then the link 13 is introduced through the opening 18 for articulation with the hook member 17, so that the link 11 connects together the end links 12 and 13 of the broken chain, and the latter is ready for use, as shown in Fig. 6.

When the chain is applied to a tire, the tension and centrifugal force automatically cause the links 12 and 13 to normally occupy the positions illustrated in Figs. 1 and 6, and the keeper 20 will then take its intermediate position, in which it prevents escape of the links 12 and 13 from the openings 16 and 18, while on the other hand the links 12 and 13 prevent sliding movement of the keeper 20 in either direction; and this relative position of the links will persist until the cross chain again breaks in usage or until the repair link is worn out. The link may, however, be removed by an operation reversing the steps of its application.

In carrying the invention into effect, the repair links may be made of any suitable material and may be of any suitable shape. One convenient mode of construction is to bend straight pieces of wire of round or other suitable cross section, and of suitable length, to form at each end the hooks 15 and 17 already described, leaving the openings 16 and 18 to which reference has been made above.

A convenient method of forming a keeper 20 of the desired form is to bend a short strip of sheet metal into the preferred annular form, either before or after formation of the link proper. Preferably the keeper 20 will be formed separately and applied to the shank 14 before the latter is bent to form the hooks 15 and 17. Another mode of constructing the keeper 20 is to sever pieces of suitable length from tubular stock and then apply the annular members thus formed to the shanks 14 of the links prior to bending the latter to form hooks.

Modified forms of the keepers may be provided of numerous different types, including those hereinafter described.

For example an assembly of rings such as those shown in Fig. 7 at 30 may be used, a suitable number being applied to the shank 14 to form a sliding annular keeper which will operate in a manner similar to that described with reference to the sheet metal keeper 20.

Another modification is shown in Fig. 8, comprising a helically coiled wire 40 of suitable length and dimensions to constitute a keeper like that shown at 20 and already described.

Each of the above described modifications will preferably be mounted slidingly upon the shank 14 for the purpose already described, viz.: to afford a yielding effect to permit the links 12 and 13 to be introduced in turn through the openings 16 and 18 respectively for articulation with the hooks 15 and 17.

As a further modification, the yielding effect may be secured by providing an elastic or compressible form of keeper, as for example by providing a loosely coiled spring, such as that shown in Fig. 9 at 50, which in its expanded condition blocks the openings 16 and 18 but which may be compressed at either end to permit the introduction of the links 12 and 13 in turn, for articulation respectively with the hooks 15 and 17.

As one other form of possible modification Fig. 10 illustrates a link of the form already described, and in which the various parts are designated by the same reference characters, and are operated similarly, so that they need not be again described.

The keeper 70, shown in this modification, is however, formed as a coiled spring with which are associated telescopically a pair of cup-shaped annular members 71 and 72, each covering one end of the spring but leaving sufficient space to permit the spring to be compressed for the purpose of clearing the openings 16 and 18 to permit introduction of links, such as those designated by the reference characters 12 and 13, for articulation with the hooks 15 and 17.

Another form of compressible elastic yielding annular keeper is shown in Fig. 11, comprising a rubber annulus 60 surrounding the shank 14 in position to block the openings 16 and 18. The links 12 and 13 may be applied by forcing them past the edges 61 of the rubber annulus, which yields sufficiently to permit such forcible introduction and then regains its normal position, blocking the openings 16 and 18 against disengagement from the links 12 and 13 under any strain likely to occur in usage. The annulus 60 may fit tightly upon the strand 14, to avoid easy sliding movement, so that it will retain its central position normally, but it will not be necessary to vulcanize, or otherwise fasten, the rubber annulus in place ordinarily.

In each of the forms already described, the link is provided with an open hook at each end, but such provision for a double hook effect is not essential to carrying the invention into effect in instances where it may be desirable to constitute such a link a permanent member of a chain.

For example, in Fig. 12, a link is illustrated having a shank 24 bent at one end to form a closed loop 27 articulated permanently with a link 23 of a cross chain. The other end of the shank 24 is bent to form an open hook 25 having an opening 26 of suitable dimensions to permit introduction of a link 22 for articulation with the hook 25. In the instance shown in Fig. 12, a rubber keeper 66 is shown surrounding the shank 24 and abutting at its end 64 against the loop 27, the end 63 of the keeper extending into the opening 26 sufficiently to block the same as already described. The link 22 may be forced past the end 63 until it is articulated with the hook 25, after which the disengagement of the link 22 is prevented by the end 63 of the keeper 66 in the manner already described. The link 22 may be disengaged by a reversal of the operation when sufficient force is applied, but as already indicated the keeper 66 will be effective to permit actual disengagement under strains likely to occur in usage.

It will be obvious that a link of this type may be provided with a compressible keeper consisting of an expanded coiled spring of the type shown in Fig. 9 at 50, or a keeper of the compressible type shown in Fig. 10 at 72, no further illustration or description being necessary to enable these modifications to be understood.

In the modification shown in Fig. 13, a repair link of the general character described with reference to Figs. 1 to 3 is shown, having a shank 14, bent to form hooks 15 and 17, leaving openings 16 and 18, closed normally by a keeper 35 similar to that designated 20 in Figs. 1 to 3, but somewhat longer, to block more effectively the openings 16 and 18. In order to allow the keeper 35 to move sufficiently far along the shank 14 to clear the opening 16, the keeper has a notch or slot 36 near its right-hand end, to receive the hook portion 37 as the keeper slides in that direction. By rotating the keeper it may be further incapacitated from accidental displacement along the shank 14.

While the invention, formed as above, is of greatest utility when embodied in a repair link of any of the forms already described, or other suitable form of construction, it is capable of use to advantage in the formation of a type of connecting link or device which serves to permit ready connection or disconnection at either end of a cross chain to a side chain, so that a cross chain provided with such a connecter at each end may be readily applied to, or detached from, a pair of side chains.

Fig. 12, already described, illustrates one suitable embodiment of the invention for this purpose, and another embodiment of the invention, for this purpose, is illustrated in Fig. 14.

In the form shown in Fig. 14, the connecting device is formed with a shank 84 and provided with an annular keeper 80 corresponding generally in essential particulars with the shank 14 and keeper 20 described with reference to Figs. 1 to 3. The shank 84 is bent at each end to form hooks 85 and 87 respectively like those already described with reference numerals 15 and 17, but the hook 85 is designed to be connected permanently with a link 82 of a cross chain, and for that purpose has a relatively narrow opening 86, the keeper 80 being of such length that no matter what its position the link 82 cannot escape from the hook 85.

The hook 85 is, however, of suitable dimensions to afford a space within which the end 89 of the link 82 may be held by the operator out of the path of the keeper 80 when the latter is moved slidingly into the hook 85 for the purpose of clearing the opening 88 to permit this end of the cross-chain to be hooked upon the link 83 of a side chain. After such a connection has been accomplished, the keeper 80 is moved slidingly through the opening 88, and the end 89 of the link 82 can then occupy the position shown in Fig. 14, preventing further sliding movement of the keeper 80 when the device is in use.

Without further description, it will be understood that, so far as suitable, any of the forms of construction already illustrated and described may be utilized in making a connecting hook for connecting a cross chain to side chains, and in general any desirable modification may be adopted embodying this feature of the invention.

It is to be understood also that the general contour of the link may be varied as found suitable in particular embodiments of the invention, and the relative dimensions and positions of the various parts may be modified. While it is desirable usually to form the hooks 15 and 17 in somewhat different angular positions relatively to the shank 14, as illustrated in Fig. 2, it is to be noted that in some instances it may be desirable to form them in the same plane with each other and with the shank, and in other instances it may be desirable to increase their angular displacement relatively to each other. Such variations, and others, which need not be illustrated or further described, fall within the spirit of the invention.

The form of device shown in Figs. 1 to 6 is regarded as a preferred embodiment of the invention, and has been so described, for the reason that it embodies more completely than some of the other forms what has been found in commercial use to constitute a very desirable provision, viz., the arrangement of the annular keeper 20 upon the shank 14 in such relation to the open end hooks 15 and 17, and the connected links 12 and 13, that when a repaired chain is in its normal position the connected links occupy positions which prevent sufficient displacement of the keeper to permit disconnecting. In order to disconnect the right hand link, for example, the left hand link must be manipulated out of its normal position into an abnormal position out of the path of the keeper, so as to let the keeper pass into the position normally occupied by the link so manipulated. Until the keeper gets into that position, the right hand link cannot be removed, and so will not be accidentally disconnected in use.

From the foregoing, it will be clear that the invention provides a simple and inexpensive device for use as a repair link or connecting hook, and which is very reliable in service, and is capable of sustaining the wear of usage for a desirably long time. A keeper of any of the forms illustrated will serve also as a reinforcement of the link, sharing in the wear upon the link. When made rotatable, it will act to distribute the wear.

Having thus described the illustrated embodiments of my invention and having in mind that variations and modifications of the same may be made, I define the scope of the invention by the following claims.

I claim:

1. A chain-connecter comprising a shank provided at each end with a hook the free end of which extends toward an intermediate portion of said shank, leaving an opening for introduction of a chain link to each hook, and a keeper of annular form mounted on said intermediate portions of the shank and adapted to close said openings and prevent disengagement of said links and hooks said keeper being yieldable lengthwise and diametrically to clear said openings for said introduction of said links to said hooks.

2. A chain-connecter comprising a shank provided with an end hook the free end of which extends toward an intermediate portion of said shank, leaving an opening for introduction of a chain link to said hook, and a keeper of annular form mounted on said shank and adapted to close said opening and prevent disengagement of said link and hook, said keeper being yieldable slidingly to clear said opening for said introduction of a link to said hook, said opening being large enough to permit said keeper to slide into said hook, and said hook being of suitable size to permit an attached link to occupy a position therein out of the path of said keeper.

3. A chain-connecter comprising a shank provided with an end hook the free end of which extends toward an intermediate portion of said shank, leaving an opening for introduction of a chain link to said hook, and a keeper of elastic material, such as rubber, mounted on said intermediate portions of the shank and adapted to close said opening and prevent disengagement of said link and hook, said keeper being compressible to clear said opening for said introduction of a link to said hook.

4. A chain-connecter comprising a shank provided with an end hook the free end of which extends toward an intermediate portion of said shank, leaving an opening for introduction of a chain link to said hook, and a keeper of annular form, comprising an assembly of rings mounted slidingly on said intermediate portions of the shank and adapted to close said opening and prevent disengagement of said link and hook.

5. A chain-connecter comprising a shank provided with an end hook the free end of which extends toward an intermediate portion of said shank, leaving an opening for introduction of a chain link to said hook, and a keeper of annular form, comprising a helical coil of wire mounted on said intermediate portions of the shank and adapted to close said opening and prevent disengagement of said link and hook, said keeper being yieldable lengthwise to clear said opening for said introduction of a link to said hook.

6. A chain-connecter comprising a shank provided with an end hook the free end of which extends toward an intermediate portion of said shank, leaving an opening for introduction of a chain link to said hook, and a keeper of annular form, comprising a coiled spring mounted on said intermediate portions of the shank and adapted to close said opening and prevent disengagement of said link and hook, said keeper being compressible to clear said opening for said introduction of a link to said hook.

7. A chain link comprising a wire strand having a substantially straight body portion and bent at each end to form hooks with openings presented toward each other adjacent an intermediate portion of said body strand, the free ends of said hooks being spaced apart from each other and from said body strand to permit a separate chain link or links to be introduced therebetween and thereby articulated with either or both of said loops, and a keeper comprising a metal ferrule of annular form mounted slidingly upon said intermediate portions of the body strand, said keeper being movable lengthwise upon said strand to permit said introduction of separate chain links to said loops respectively and said keeper acting when in an intermediate position on said strand to prevent relative displacement from each other of said articulated links.

8. A chain-connecter comprising a shank provided at each end with an open hook the free end of which extends toward an intermediate portion of said shank, leaving an opening for introduction of a chain link to said hook, and a keeper of annular form mounted on said intermediate portions of the shank and adapted to close said openings and prevent disengagement of said links and hooks, said keeper being yieldable slidingly to clear one of said openings for said introduction of a link to said hook, and said keeper and said other hook being of suitable relative dimensions to permit sliding movement of one end of said keeper into said last mentioned hook while a link is in place within said hook, said keeper acting to prevent disengagement of said latter link from said latter hook at any time.

9. A cross-chain comprising an assembly of links provided at each end with a chain-connecter characterized by the structure set forth in claim 8, whereby said cross-chain is adapted to be readily connected with the side-chains of a tire chain.

10. A cross-chain comprising an assembly of links provided at each end with a permanently attached chain-connecter characterized by the structure set forth in claim 8, whereby said cross-chain is adapted to be readily connected with the side-chains of a tire chain.

11. A cross-chain comprising an assembly of links provided at each end with a permanently attached chain-connecter characterized by the structure set forth in claim 8, whereby said cross-chain is adapted to be readily connected with and removed from the side-chains of a tire chain.

12. A chain-connecter comprising a shank provided at each end with an open hook the free end of which extends toward an intermediate portion of said shank, leaving an opening for introduction of a chain link to said hook, and a keeper of annular form mounted on said intermediate portions of the shank and adapted to close said openings and prevent disengagement of said link and hook, said hooks occupying different angular positions relatively to said shank.

13. A chain-connecter characterized by a shank having open end-hooks to receive chain links to be connected, and a sliding keeper on said shank adapted to be maintained in hook-closing position by the connected links when occupying their relative positions normal to use of the chain, said keeper being movable into one of said hooks when the link therein is manipulated in said hook to clear the path of the keeper, whereby the other hook may be cleared for disconnection or connection of its corresponding link.

14. A chain-connecter characterized by a shank having open end-hooks to receive chain links to be connected, and a sliding keeper on said shank adapted to be maintained in hook-closing position by the connected links when occupying their relative positions normal to use of the chain, said keeper being movable into either of said hooks when the link therein is manipulated in said hook to clear the path of the keeper, whereby the other hook may be cleared for disconnection or connection of its corresponding link.

In testimony whereof, I have signed this specification.

JOHN R. REYBURN.